United States Patent
Hirota et al.

(10) Patent No.: US 9,365,737 B2
(45) Date of Patent: Jun. 14, 2016

(54) COATING AGENT, DECORATIVE FILM AND ARTICLE

(71) Applicant: Mitsui Chemicals, Inc., Minato-ku, Tokyo (JP)

(72) Inventors: Yoshihito Hirota, Chiba (JP); Yuichi Ito, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/397,436

(22) PCT Filed: Apr. 25, 2013

(86) PCT No.: PCT/JP2013/062266
§ 371 (c)(1),
(2) Date: Oct. 27, 2014

(87) PCT Pub. No.: WO2013/164976
PCT Pub. Date: Nov. 7, 2013

(65) Prior Publication Data
US 2015/0087769 A1    Mar. 26, 2015

(30) Foreign Application Priority Data

May 1, 2012 (JP) .................................. 2012-104733

(51) Int. Cl.
| | | |
|---|---|---|
| *C08K 5/01* | (2006.01) | |
| *C08G 63/48* | (2006.01) | |
| *C09D 123/28* | (2006.01) | |
| *C09J 7/02* | (2006.01) | |
| *C09J 123/14* | (2006.01) | |
| *C09D 151/00* | (2006.01) | |
| *C09J 123/28* | (2006.01) | |
| *C09J 151/00* | (2006.01) | |
| *C08F 255/10* | (2006.01) | |
| *C09D 151/06* | (2006.01) | |
| *C09J 151/06* | (2006.01) | |

(52) U.S. Cl.
CPC .......... *C09D 123/283* (2013.01); *C08F 255/10* (2013.01); *C09D 151/003* (2013.01); *C09D 151/06* (2013.01); *C09J 7/0203* (2013.01); *C09J 7/0257* (2013.01); *C09J 123/14* (2013.01); *C09J 123/283* (2013.01); *C09J 151/003* (2013.01); *C09J 151/06* (2013.01); *C08L 2207/324* (2013.01); *C09J 2201/61* (2013.01); *C09J 2201/622* (2013.01); *C09J 2423/00* (2013.01); *C09J 2423/003* (2013.01); *C09J 2491/00* (2013.01); *C09J 2491/003* (2013.01)

(58) Field of Classification Search
CPC ............ C09D 123/283; C09D 151/003; C09J 123/283; C09J 151/003; C09J 2201/61
USPC ........................................................... 524/487
See application file for complete search history.

(56) References Cited

U.S. PATENT DOCUMENTS

| | | | |
|---|---|---|---|
| 5,468,807 A | 11/1995 | Tsurutani et al. | |
| 7,645,829 B2 * | 1/2010 | Tse ...................... | C09D 123/10 524/515 |
| 7,795,366 B2 * | 9/2010 | Yang ........................ | C08K 5/01 526/348 |
| 2004/0258905 A1 | 12/2004 | Hase et al. | |
| 2006/0276607 A1 | 12/2006 | Ikenaga et al. | |
| 2009/0165946 A1 | 7/2009 | Suzuki et al. | |
| 2013/0157051 A1 | 6/2013 | Nagano et al. | |

FOREIGN PATENT DOCUMENTS

| | | |
|---|---|---|
| CN | 1948380 A | 4/2007 |
| JP | H3-160083 A | 7/1991 |
| JP | 05-194802 A | 8/1993 |
| JP | H8-060121 A | 3/1996 |
| JP | 2001-262042 A | 9/2001 |
| JP | 2002-178466 A | 6/2002 |
| JP | 2004-299220 A | 10/2004 |
| JP | 2004-299223 A | 10/2004 |
| JP | 3939464 B2 | 4/2007 |
| JP | 2009-173011 A | 8/2009 |
| JP | 2011-208149 A | 10/2011 |
| WO | WO-01/68785 A1 | 9/2001 |
| WO | WO-2004/087775 A1 | 10/2004 |
| WO | WO-2007/002177 A1 | 1/2007 |
| WO | WO-2012/005080 A1 | 1/2012 |

OTHER PUBLICATIONS

Encyclopedia of Polymer Science and Engineering (2nd Edition), "Isobutylene Polymers," vol. 8, p. 432-433, (John Wiley & Sons).
International Search Report dated Aug. 6, 2013 issued in Application No. PCT/JP2013/062266.
An Extended European Search Report dated Dec. 18, 2015 issued in European Patent Application No. 13785253.9.

* cited by examiner

*Primary Examiner* — Hui Chin
(74) *Attorney, Agent, or Firm* — Foley & Lardner LLP

(57) ABSTRACT

Provided are a coating agent giving a coating film which has superior adhesion even to polyolefin resin base materials that have not been subjected to preliminary surface treatment and which has satisfactory adhesion even to high-polarity base materials; a decorative film having at least one layer formed from said coating agent; an article decorated with said decorative film. The coating agent includes an olefin polymer having a heat of fusion in the range of 0 to 50 J/g and having a weight average molecular weight (Mw) as measured by GPC of $1\times10^4$ to $1000\times10^4$, and a hydrocarbon-based synthetic oil having a 40° C. kinematic viscosity of 30 to 500,000 cSt.

11 Claims, No Drawings

US 9,365,737 B2

COATING AGENT, DECORATIVE FILM AND ARTICLE

CROSS REFERENCE TO RELATED APPLICATIONS

This application is the National Phase of PCT/JP2013/062266, filed Apr. 25, 2013, which claims priority to Japanese Application No. 2012-104733, filed May 1, 2012.

TECHNICAL FIELD

The present invention relates to a coating agent, a decorative film and an article, and in more detail, relates to a coating agent useful as a coating material, a primer and an adhesive, a decorative film and an article.

BACKGROUND ART

Polyolefin resins such as polypropylene and polyethylene are widely used because of being inexpensive and excellent in e.g., moldability, chemical resistance, water resistance, electrical property and safety. However, since polyolefin resins are hydrophobic materials with low polarity, adhering the polyolefin resins to polar resins such as acrylic resins, polyester-based resins, polycarbonate-based resins and ABS resins is difficult. Thus, it is now difficult to laminate the polar resins on the surface of the polyolefin resins and to decorate the surface of the polyolefin resins with an ink or a coating material.

A resin adhesive to such polyolefin resins that has been known is, for example, acid-modified polyolefin resin such as a resin modified with an unsaturated carboxylic acid (Patent Document 1); a chlorinated polyolefin resin, an acrylic sticky adhesive, a styrene-ethylene-propylene-styrene block copolymer rubber (Patent Document 2); a styrene-butadiene-styrene block copolymer rubber (Patent Document 3); or a modified block copolymer which is a hydrogenated product of a styrene.conjugated diene.styrene-based block copolymer graft-copolymerized with maleic anhydride (Patent Document 4).

Still, even with the use of these materials, it is now difficult to allow the polyolefin resins to exhibit sufficient adhesion to a wide range of materials ranging from low-polarity polyolefin resins to polar resins such as acrylic resins, polyester-based resins, polycarbonate-based resins and ABS resins, particularly at the time of application procedure conducted at low temperature of about 100° C.

Meanwhile, as a novel decorating technique, a method has been proposed in which a design film (decorative film) is attached to molded articles with various forms and the molded articles are thus decorated (Patent Documents 5 and 6). This method, which can simplify coating step, increases added value and decreases environmental load, has been already used for e.g., housings of household appliances and automobile interior and exterior parts.

Since base materials of the design layer are generally resins with high polarity such as urethane-based resin and acrylic resin, in order to attach the decorative film to a molded article of the polyolefin resin such as polypropylene, a bonding layer is required to adhere the polyolefin resin to the design layer with high polarity such as urethane-based resin and acrylic resin.

CITATION LIST

Patent Literature

[Patent Document 1] JP-B-3939464
[Patent Document 2] JP-A-H3-160083
[Patent Document 3] JP-A-H8-60121
[Patent Document 4] WO 01/068785
[Patent Document 5] JP-A-2004-299220
[Patent Document 6] JP-A-2004-299223

SUMMARY OF THE INVENTION

Technical Problem

An object of the present invention is to provide a coating agent giving a coating film which has superior adhesion even to polyolefin resin base materials that have not been subjected to preliminary surface treatment such as corona treatment and which has satisfactory adhesion even to high-polarity base materials such as acrylic resins, polyester-based resins, polycarbonate-based resins and ABS resins; and to provide a decorative film having at least one layer formed from said coating agent; and an article decorated with said decorative film.

Technical Solution

The present inventors made their earnest studies in view of the above situation, and have found that by using a coating agent for imparting adhesion to a decorative film that is given by incorporating a hydrocarbon-based synthetic oil having a specific kinematic viscosity to a specific low-crystalline olefin polymer, improved adhesion to a base material to be decorated is attained, and much more kinds of base materials can be decorated, thereby perfecting the present invention.

That is, the present invention relates to [1] to [13] described below.

[1] A coating agent comprising an olefin polymer (A) having a heat of fusion as measured in accordance with JIS K 7122 being in the range of 0 to 50 J/g and having a weight average molecular weight (Mw) as measured by GPC of $1 \times 10^4$ to $1000 \times 10^4$, and a hydrocarbon-based synthetic oil (B) having a 40° C. kinematic viscosity of 30 to 500,000 cSt.

[2] The coating agent described in the above [1], wherein the olefin polymer (A) is at least one selected from the group consisting of (A1) to (A3):

(A1) a polymer containing structural units derived from α-olefins having 2 to 20 carbon atoms;

(A2) a modified olefin polymer obtained from a polymer which contains structural units derived from α-olefins having 2 to 20 carbon atoms and part or whole of which is graft-modified with a polar group-containing monomer; and (A3) a halogenated olefin polymer obtained from a polymer which contains structural units derived from α-olefins having 2 to 20 carbon atoms and part or whole of which is halogen-modified.

[3] The coating agent described in the above [2], wherein the (A2) described above is (A2') described below and the (A3) described above is (A3') described below:

(A2') a modified olefin polymer obtained from a polymer which contains structural units derived from α-olefins having 2 to 20 carbon atoms and part or whole of which is graft-modified with a polar group-containing monomer, wherein based on 100 parts by weight of the modified olefin polymer, 0.1 to 15 parts by weight of structural units derived from the polar group-containing monomer is contained; and (A3') a halogen-modified olefin polymer obtained from a polymer which contains structural units derived from α-olefins having 2 to 20 carbon atoms and part or whole of which is halogen-modified, wherein based on 100 parts by weight of the halogen-modified olefin polymer, the halogen content is 2 to 40 parts by weight.

[4] The coating agent described in the above [3], wherein the (A1) described above is (A1") described below, the (A2') described above is (A2") described below, and the (A3') described above is (A3") described below:

(A1") a propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %);

(A2") a modified olefin polymer obtained from a propylene-based polymer part or whole of which is graft-modified with a polar group-containing monomer, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the modified olefin polymer, 0.1 to 15 parts by weight of structural units derived from the polar group-containing monomer is contained; and (A3") a halogen-modified olefin polymer obtained from a propylene-based polymer part or whole of which is halogen-modified, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the halogen-modified olefin polymer, the halogen content is 2 to 40 parts by weight.

[5] The coating agent described in any one of the above [2] to [4], wherein the polar group-containing monomer is at least one selected from unsaturated carboxylic acids and unsaturated carboxylic acid anhydrides.

[6] The coating agent described in any one of the above [1] to [5], wherein the hydrocarbon-based synthetic oil (B) is a polymer of an olefin having 2 to 20 carbon atoms.

[7] The coating agent described in any one of the above [1] to [6], wherein the olefin polymer (A) accounts for 20 to 99 parts by weight, and the hydrocarbon-based synthetic oil (B) accounts for 80 to 1 parts by weight (provided that the total of (A) and (B) is 100 parts by weight).

[8] The coating agent described in any one of the above [1] to [7], which is a primer.

[9] The coating agent described in any one of the above [1] to [7], which is a coating material.

[10] The coating agent described in any one of the above [1] to [7], which is a hot melt adhesive.

[11] A decorative film having at least one layer formed from the coating agent described in any one of the above [1] to [7].

[12] An article decorated with the decorative film described in the above [11].

[13] The article described in the above [12], wherein the decoration is performed by using a vacuum pressure forming machine.

Effects of the Invention

The coating agent of the present invention provides a coating film which has excellent adhesion to polyolefin resin base materials and which has satisfactory adhesion also to high-polarity base materials including acrylic resins, polyester-based resins, polycarbonate-based resins and ABS resins.

The decorative film of the present invention has excellent adhesion to polyolefin resin base materials and satisfactory adhesion also to high-polarity base materials including acrylic resins, polyester-based resins, polycarbonate-based resins and ABS resins.

The article of the present invention is decorated with the decorative film, and therefore the adhesion is high between the decorative film and a base material.

DESCRIPTION OF EMBODIMENTS

[Coating Agent]

The coating agent of the present invention includes an olefin polymer (A) having a heat of fusion as measured in accordance with JIS K 7122 being in the range of 0 to 50 J/g and having a weight average molecular weight (Mw) as measured by GPC of $1 \times 10^4$ to $1000 \times 10^4$, and a hydrocarbon-based synthetic oil (B) having a 40° C. kinematic viscosity of 30 to 500,000 cSt.

Olefin Polymer (A)

The olefin polymer (A) used in the present invention has a heat of fusion as measured in accordance with JIS K 7122 being in the range of 0 to 50 J/g and having a weight average molecular weight (Mw) as measured by GPC of $1 \times 10^4$ to $1000 \times 10^4$. That is, the coating agent of in the present invention uses, as the olefin polymer (A), a substance with crystallinity that is low to some degree. In the present specification, for the distinction from the "hydrocarbon-based synthetic oil (B)" described later, the olefin polymer (A) is sometimes called a "low-crystalline olefin resin (A)" or a "low-crystalline olefin resin".

Here, the amount of heat of fusion can be determined in accordance with JIS K 7122 by differential scanning calorimetry (DSC measurement), and specifically is calculated from a peak area of thermogram obtained in temperature-increase process conducted at 10° C./min. In the present invention, for the purpose of cancelling heat history before the measurement, prior to the measurement, temperature is increased at 10° C./min to a melting point+20° C., and this temperature is maintained for 3 minutes, and thereafter temperature is decreased at 10° C./min to room temperature. After this procedure, the amount of heat of fusion is measured.

The amount of heat of fusion is 0 J/g or more and 50 J/g or less, the lower limit being preferably 3 J/g, more preferably 5 J/g, the upper limit being preferably 40 J/g or less, more preferably 30 J/g or less. The amount of heat of fusion being 50 J/g or less is preferred, since the state where the coating agent of the present invention is dissolved in a solvent, namely the state of a varnish, is so stable that solidification and precipitation hardly occur.

Meanwhile, in terms of strength and anti-tackiness of the coating film, it is preferred for the lower limit of the amount of heat of fusion to be higher.

The olefin polymer (A) used in the present invention has a weight average molecular weight as measured by GPC in terms of polystyrene of $1 \times 10^4$ or more and $1000 \times 10^4$ or less, more preferably $2 \times 10^4$ or more and $100 \times 10^4$ or less, still more preferably $3 \times 10^4$ or more and $50 \times 10^4$ or less. The weight average molecular weight of $1 \times 10^4$ or more is preferable in that a coating film can have sufficiently high strength as well as good adhesion strength. Meanwhile, the weight average molecular weight of $1000 \times 10^4$ or less is preferable, since the state of a varnish is so stable that solidification and precipitation hardly occur. In particular, the olefin polymer (A) when having a small weight average molecular weight (for example, not more than $50 \times 10^4$) tends to give excellent adhesion performance, in particular.

The olefin polymer (A) used in the present invention is not particularly limited as long as fulfilling the requirements in terms of the amount of heat of fusion and the weight average molecular weight, but for example, an α-olefin polymer or a copolymer of two or more α-olefins can be mentioned. Examples of the α-olefin include α-olefins having 2 to 20 carbon atoms, which include, for example, ethylene, propylene, 1-butene, octene, 4-methyl-1-pentene and the like. That is, examples of the olefin polymer (A) are polymers containing structural units derived from α-olefins having 2 to 20 carbon atoms.

The olefin polymer (A) may further contain structural units derived from unsaturated monomers other than the α-olefins (hereinafter referred to as the "other unsaturated monomers") in a range that is not more than 10 mol % based on 100 mol % of structural units derived from the α-olefins. Here, examples of said other unsaturated monomers include conjugated polyenes such as butadiene and isoprene and nonconjugated polyenes such as 1,4-hexadiene, 1,7-octadiene, dicyclopentadiene, 5-ethylidene-2-norbornene, 5-vinyl-2-norbornene, 5-methylene-2-norbornene and 2,5-norbornadiene. When the olefin polymer (A) is a copolymer containing structural units derived from two or more kinds of α-olefins, the polymer (A) may be a random copolymer or a block copolymer.

Further, the olefin polymer (A) may be a modified olefin polymer which is obtained, for example, by allowing a polymer or a copolymer containing structural units derived from the α-olefins to be graft-reacted with an unsaturated monomer containing e.g., a hydroxyl group, a carboxylic acid anhydride or —COOX (X: H, M) (wherein H is hydrogen; and M is a cation derived from an alkali metal, an alkali earth metal or an amine). Further, the olefin polymer (A) may be a halogenated olefin polymer obtained by further halogenating a polymer or a copolymer containing structural units derived from the α-olefins.

The olefin polymer (A) preferably used in the present invention is, for example, at least one polymer selected from the following (A1) to (A3):

(A1) a polymer containing structural units derived from α-olefins having 2 to 20 carbon atoms (hereinafter referred to as "polymer (A1)");

(A2) a modified olefin polymer obtained from a polymer which contains structural units derived from α-olefins having 2 to 20 carbon atoms and part or whole of which is graft-modified with a polar group-containing monomer (hereinafter referred to as "modified olefin polymer (A2)"); and (A3) a halogen-modified olefin polymer obtained from a polymer which contains structural units derived from α-olefins having 2 to 20 carbon atoms and part or whole of which is halogen-modified (hereinafter referred to as "halogenated olefin polymer (A3)").

Polymer (A1)

Examples of the polymer (A1) are polymers containing structural units derived from α-olefins having 2 to 20 carbon atoms described above. That is, in the present invention, polymers containing structural units derived from α-olefins having 2 to 20 carbon atoms themselves, without being subjected to modification treatment such as graft modification and halogen modification, may be used as the polymer (A1) for the olefin polymer (A). In this sense, the polymer (A1) can be referred to as an unmodified polymer (A1), which is distinguished from a "modified olefin polymer (A2)" and a "halogenated olefin polymer (A3)" which are described later.

Here, the polymer (A1) according to a preferred embodiment of the present invention is a propylene-based polymer containing 50 to 100 mol % of structural units derived from propylene and 50 to 0 mol % of structural units derived from α-olefins having 2 to 20 carbon atoms excluding propylene, provided that the total of the structural units derived from α-olefins having 2 to 20 carbon atoms is 100 mol %. Here, preferred examples of the "α-olefins having 2 to 20 carbon atoms excluding propylene" include 1-butene and octene. Here, provided that the total of the structural units derived from α-olefins having 2 to 20 carbon atoms is 100 mol %, more preferred is a propylene-based polymer containing structural units derived from propylene accounting for 55 to 90 mol %, still more preferably 60 to 85 mol %, further preferably 60 to 80 mol %, and structural units derived from α-olefins having 2 to 20 carbon atoms excluding propylene accounting for 45 to 10 mol %, still more preferably 40 to 15 mol %, further preferably 40 to 20 mol %.

In the present invention, the polymer (A1) may be used singly or in combination of two or more kinds thereof.

The polymer (A1) used in the present invention can be produced by a known process which is not particularly limited as long as the olefin polymer (A) as a whole fulfills the above-mentioned amount of heat of fusion and the above-mentioned weight average molecular weight (Mw). For example, the polymer (A1) can be produced in accordance with methods described in Patent Document 1 and WO 2004/87775. Here, taking, as an example, a propylene.1-butene copolymer preferably used as the polymer (A1) in the present invention, the propylene.1-butene copolymer can be produced by copolymerizing propylene and 1-butene, for example in the presence of a metallocene catalyst composed of an appropriate metallocene compound such as rac-dimethylsilylene-bis{1-(2-methyl-4-phenylindenyl)}zirconium dichloride, an organoaluminum-oxy compound such as aluminoxane and an optionally used organoaluminum compound such as tributylaluminum.

Modified Olefin Polymer (A2)

Examples of the modified olefin polymer (A2) are modified olefin polymers obtained from polymers which contain structural units derived from the α-olefins having 2 to 20 carbon atoms and part or whole of which is graft-modified with a polar group-containing monomer. Preferably, based on 100 parts by weight of the modified olefin polymer, structural units derived from the polar group-containing monomer are contained in an amount of 0.1 to 15 parts by weight, more preferably 0.5 to 10 parts by weight. For example, in the present invention, a polymer containing structural units derived from α-olefins having 2 to 20 carbon atoms, (A1a), may be graft-modified with a polar group-containing monomer, and a graft-modified olefin polymer (A2m) thus obtained itself can be defined as the modified olefin polymer (A2), and this can be used for the olefin polymer (A). Here, examples of the polymer (A1a) may be those given as the polymer (A1).

The modified olefin polymer (A2) may be a mixture of a graft-modified product of (A1a) described above, namely, the graft-modified olefin polymer (A2m), and the unmodified (A1a) that form a modified olefin polymer composition. In this case, (A1a) used for graft modification and (A1a) used without being modified may be the same or different. This embodiment is an example where part of the polymer containing structural units derived from α-olefins having 2 to 20 carbon atoms is graft-modified with a polar group-containing monomer.

The weight average molecular weight of the polymer (A1a) employable above is not particularly limited as long as the corresponding modified olefin polymer (A2) as a whole fulfills the above-mentioned weight average molecular weight, but is generally $1 \times 10^4$ to $1000 \times 10^4$, preferably $2 \times 10^4$ or more and $100 \times 10^4$ or less, more preferably $3 \times 10^4$ or more and $50×10^4$ or less. The amount of heat of fusion as measured in accordance with JIS K 7122 is not particularly limited as long as (A2) fulfills the above-mentioned weight average molecular weight, but the amount of heat of fusion is 0 J/g or more 50 J/g or less, the lower limit being preferably 3 J/g, more preferably 5 J/g, the upper limit being preferably 40 J/g or less, more preferably 30 J/g or less. The modified olefin polymer (A2) used in the present invention preferably contains 0.1 to 15 parts by weight of structural units derived from the polar group-containing monomer based on 100 parts by weight of the total of the graft-modified olefin polymer (A2m) and the optional unmodified (A1a).

In the present invention, to obtain the graft-modified olefin polymer (A2m) constituting the modified olefin polymer (A2), the polymer (A1a) is graft copolymerized with a polar group-containing monomer. Examples of the polar group-containing monomer are hydroxyl group-containing ethylenically unsaturated compounds, amino group-containing ethylenically unsaturated compounds, epoxy group-containing ethylenically unsaturated compounds, unsaturated carboxylic acids and their anhydrides and their derivatives, vinyl ester compounds, and vinyl chloride. Preferred are unsaturated carboxylic acids and their anhydrides.

Examples of the hydroxyl group-containing ethylenically unsaturated compounds include hydroxyl group-containing (meth)acrylic acid esters such as hydroxyethyl (meth)acrylate, 2-hydroxypropyl (meth)acrylate, 3-hydroxypropyl (meth)acrylate, 2-hydroxy-3-phenoxy-propyl (meth)acrylate, 3-chloro-2-hydroxypropyl (meth)acrylate, glycerin mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydrohexanoyloxy) ethylacrylate; and 10-undecene- 1-ol, 1-octene -3-ol, 2-methanolnorborne, hydroxystyrene, N-methylolacrylamide, 2-(meth)acryloyloxy ethyl acid phosphate, glycerin monoallyl ether, allyl alcohol, allyloxy ethanol, 2-butene-1,4-diol and glycerin monoalcohol.

Examples of the amino group-containing ethylenically unsaturated compounds include vinyl-based monomers having at least one kind of amino group or substituted amino group that is represented by the following formula.

(wherein $R_1$ is a hydrogen atom, a methyl group or an ethyl group; $R_2$ is a hydrogen atom, an alkyl group having 1 to 12 carbon atoms, preferably 1 to 8 carbon atoms, or a cycloalkyl group having 8 to 12 carbon atoms, preferably 6 to 9 carbon atoms; and the alkyl group and the cycloalkyl group may further have a substituent).

Examples of the amino group-containing ethylenically unsaturated compounds include alkyl ester-based derivatives of acrylic acid or methacrylic acid, such as aminomethyl (meth)acrylate, propylaminoethyl(meth)acrylate, dimethylaminoethyl methacrylate, aminopropyl(meth)acrylate, phenylaminomethyl methacrylate, cyclohexylaminoethyl methacrylate; vinylamine-based derivatives such as N-vinyldiethylamine and N-acetylvinylamine; acrylamide-based derivatives such as acrylamide, methacrylamide, N-methylacrylamide, N,N-dimethylacrylamide and N,N-dimethylaminopropylacrylamide; and imides such as p-aminohexylsuccinimide and 2-aminoethylsuccinimide.

Examples of the epoxy group-containing ethylenically unsaturated compounds include monomers having at least one polymerizable unsaturated bonding group and epoxy group in one molecule.

Examples of the epoxy group-containing ethylenically unsaturated compounds include glycidyl esters of unsaturated carboxylic acids, such as glycidyl acrylate and glycidyl methacrylate; monoglycidyl esters of unsaturated dicarboxylic acids such as maleic acid, fumaric acid, crotonic acid, tetrahydrophthalic acid, itaconic acid, citraconic acid, endo-cis-bicyclo[2,2,1]hepto-5-en-2,3-dicarboxylic acid (nadic acid™), endo-cis-bicyclo[2,2,1]hepto-5-en-2-methyl-2,3-dicarboxylic acid (methylnadic acid™) (number of carbons of an alkyl group forming the monoglycidyl ester: 1to 12); alkyl glycidyl ester of p-styrenecarboxylic acid, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

Examples of the unsaturated carboxylic acids include unsaturated carboxylic acids such as acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2,2,1]hepto-2-en-5,6-dicarboxylic acid; and their derivatives (for example, acid anhydrides, acid halides, amides, imides, esters).

Examples of the derivatives of the unsaturated carboxylic acid include malenyl chloride, malenyl imide, maleic anhydride, itaconic anhydride, citraconic anhydride, tetrahydrophthalic anhydride, bicyclo[2,2,1]hepto-2-en-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hepto-2-en-5,6-dicarboxylate, hydroxyethyl(meth)acrylate, hydroxypropyl(meth)acrylate, glycidyl(meth)acrylate, aminoethyl methacrylate and aminopropyl methacrylate.

Examples of the vinyl ester compounds include vinyl acetate, vinyl propionate, vinyl n-lactate, vinyl isolactate, vinyl pivalate, vinyl caproate, vinyl versatate, vinyl laurate, vinyl stearate, vinyl benzoate, vinyl salicylate and vinyl cyclohexanecarboxylate.

A single kind or multiple kinds of these polar group-containing monomers may be used.

When the graft-modified olefin polymer (A2m) itself is used as the modified olefin polymer (A2), it is preferable that the polar group-containing monomer is used for graft modification in an amount of 0.1 to 15 parts by weight, preferably 0.5 to 10 parts by weight based on 100 parts by weight of the graft-modified olefin polymer (A2m).

The content proportion of the polar group-containing monomer can be measured by using a feeding ratio at the time of reacting an olefin polymer with a polar group-containing monomer in the presence of e.g., a radical initiator, or by known means such as $^1$H NMR measurement. Specific examples of NMR measurement conditions are as follows.

In $^1$H NMR measurement, ECX400, a nuclear magnetic resonance apparatus manufactured by JEOL, Ltd. is used. The conditions are as follows. The solvent is deuterated orthodichlorobenzene; the sample concentration is 20 mg/0.6 mL; the measurement temperature is 120° C.: the observation nucleus is $^1$H (400 MHz); the sequence is a single pulse; the pulse width is 5.12μ sec (45° pulse); the repetition time is 7.0 seconds; the number of scans is 500 or more; and a standard chemical shift is set at 0 ppm for hydrogen of tetramethylsilane, and the same result can be obtained also when a standard chemical shift is set at 7.10 ppm for a peak derived from remaining hydrogen of deuterated orthodichlorobenzene. Peaks of e.g., $^1$H derived from functional group-containing compounds can be assigned by ordinary method.

When the polar group-containing monomer used is a monomer having an acid functional group such as the unsaturated carboxylic acid and its anhydride, an amount that can be used as a guide for the amount of the functional group introduced to the modified olefin polymer (A2), is, for example, an acid value. Here, how to measure the acid value is, for example, as follows.

<Measurement of Acid Value>

The basic procedure is in accordance with JIS K-2501-2003.

1) A modified olefin polymer in an amount of about 10 g that is exactly weighed is introduced into a 200 mL tall beaker. Thereto, 150 mL of a mixed solvent as a titration solvent, obtained by mixing xylene and dimethylformamide at 1:1 (volume ratio), is added. As an indicator, several drops of 1 w/v % phenolphthalein ethanol solution (manufactured by Wako Pure Chemical Industries, Ltd.) are added. Then, liquid temperature is increased to 80° C. to dissolve the sample. After the liquid temperature becomes constant at 80° C., titration is carried out by using 2-propanol solution of 0.1 mol/L of potassium hydroxide (manufactured by Wako Pure Chemical Industries, Ltd.), and an acid value is determined from a titration amount.

The equation is: Acid value (mgKOH/g)=(EP1−BL1)×FA1×C1/SIZE

In the above equation, EP1 is a titre (mL); BL1 is a blank value (mL); FA1 is a factor of titrant (1.00), C1 is a value converted in terms of concentration (5.611 mg/mL: equivalent to potassium hydroxide (KOH 1 mL) of 0.1 mol/L); and SIZE is an amount of a sample collected (g).

This measurement is repeated three times to obtain values and an average thereof is defined as an acid value.

The modified olefin polymer (A2) desirably has an acid value of 0.1 to 100 mgKOH/g, more preferably 0.5 to 60 mgKOH/g, and further preferably 0.5 to 30 mgKOH/g. Here, when the graft-modified olefin polymer (A2m) is mixed with the unmodified (A1a) to form a modified olefin polymer composition and this composition is used as the modified olefin polymer (A2), it is preferable that the modified olefin polymer composition as a whole has an acid value described above.

When maleic anhydride is used as the polar group-containing monomer, graft amount can be determined also based on absorption of a carbonyl group of maleic anhydride that is detected at around 1790 cm$^{-1}$ in using an infrared spectrophotometer.

The polymer (A1a) can be graft-copolymerized with at least one kind of polar group-containing monomer selected from the polar group-containing monomers by various methods. For example, the following methods can be mentioned:

the polymer (A1a) is dissolved in an organic solvent, and the polar group-containing monomer and a radical polymerization initiator are added. Then, the resulting mixture is heated and stirred, to allow graft copolymerization reaction to proceed;

the polymer (A1a) is heat-molten, and to the resultant molten product, the polar group-containing monomer and a radical polymerization initiator are added, followed by stirring, to allow graft copolymerization to proceed;

the polymer (A1a), the polar group-containing monomer and a radical polymerization initiator are previously mixed with one another, and the resultant mixture is fed to an extruder, where heat-kneading is performed, to allow graft copolymerization reaction to proceed; and the polymer (A1a) is impregnated with a solution given by dissolving the polar group-containing monomer and a radical polymerization initiator in an organic solvent, and then is heated to a maximum temperature at which the dissolution of an ethylene.α-olefin random copolymer is not caused, to allow graft copolymerization reaction to proceed.

The reaction temperature is 50° C. or higher, particularly preferably 80 to 200° C., and the reaction time is about 1 minute to about 10 hours.

The reaction mode may be either batch mode or continuous mode, but for carrying out graft copolymerization homogenously, batch mode is preferable.

A radical polymerization initiator to be used is not limited as long as being promoting the reaction between the polymer (A1a) and the polar group-containing monomer, but particularly preferred are organic peroxides and organic peresters.

Specific examples include benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroylperoxide, tert-butylperacetate, 2,5-dimethyl-2,5-di(tert-butylperoxy)hexyne-3, 2,5-dimethyl-2,5-di(tert-butylperoxide)hexane, tert-butylbenzoate, tert-butylperphenyl acetate, tert-butylperisobutyrate, tert-butylper-sec-octoate, tert-butylperpivalate, cumylperpivalate and tert-butylperdiethyl acetate, and other examples include azo compounds, e.g., azobis-isobutylnitrile and dimethylazoisobutylnitrile.

Of these, preferred are dialkyl peroxides such as dicumyl peroxide, di-tert-butyl peroxide, 2,5-dimethyl-2,5-di(tert-butylperoxy)hexyne-3,2,5-dimethyl-2,5-di(tert-butylperoxy)hexane and 1,4-bis(tert-butylperoxyisopropyl)benzene.

It is preferable that the radical polymerization initiator is used in an amount of about 0.001 to 10 parts by weight based on 100 parts by weight of the polymer (A1a).

When the graft-modified olefin polymer (A2m) is mixed with the unmodified (A1a) to form a modified olefin polymer composition and this composition is used as the modified olefin polymer (A2), it is preferable that the composition is prepared such that based on 100 parts by weight of the total of the graft-modified olefin polymer (A2m) and the unmodified (A1a), the polar group-containing monomer for grafting accounts for 0.1 to 15 parts by weight, preferably 0.5 to 10 parts by weight.

The graft reaction may be carried out in an organic solvent or in the absence of a solvent, as described above. In the present invention, when the graft-modified olefin polymer (A2m) itself is used as the modified olefin polymer (A2) for the olefin polymer (A), since a composition given by dissolving the modified olefin polymer (A2) in an organic solvent is generally used as e.g., an adhesive, the graft-modified olefin polymer (A2m) obtained through the reaction in the organic solvent can be used as it is, or the polymer (A2m) given by further adding the same or different kind of organic solvent can be used, for the preparation of e.g., the coating agent. When no organic solvents are used to carry out the graft reaction, an organic solvent is added to dissolve the graft-product for the preparation of e.g., the coating agent of the present invention.

When the graft-modified olefin polymer (A2m), which is a graft-modified product of (A1a), is mixed with the unmodified (A1a) and this mixture is used as the modified olefin polymer (A2), the mixture previously prepared may be used for the preparation of the coating agent, or the mixing procedure may be conducted in a solvent during the preparation of the coating agent.

An organic solvent to be added in order to prepare the coating agent of the present invention during the reaction or after the reaction is not particularly limited. Examples thereof include aromatic hydrocarbons such as benzene, toluene and xylene; aliphatic hydrocarbons such as hexane, heptane, octane and decane; alicyclic hydrocarbons such as cyclohexane, cyclohexene and methylcyclohexane; alcohols such as methanol, ethanol, isopropylalcohol, butanol, pentanol, hexanol, propanediol and phenol; ketone-based solvents such as acetone, methyl isobutyl ketone, methyl ethyl ketone, pentanone, hexanone, isophorone and acetophenone; cellosolves such as methylcellosolve and ethylcellosolve; esters such as methyl acetate, ethyl acetate, butyl acetate, methyl propionate and butyl formate; halogenated hydrocarbons such as trichloroethylene dichloroethylene and chlorobenzene. Of these, aromatic hydrocarbons, aliphatic hydrocarbons and ketones are preferable. These may be used singly or in combination of two or more kinds thereof.

By the method described above, the graft-modified olefin polymer (A2m) constituting the modified olefin polymer (A2) is obtained. In the present invention, such a graft-modified olefin polymer (A2m) may be used singly or in combination of two or more kinds thereof.

When the modified olefin polymer (A2) is composed of two or more kinds of the graft-modified olefin polymers (A2m), it is preferable that the modified olefin polymer (A2) is prepared such that the polar group-containing monomer for grafting accounts for 0.1 to 15 parts by weight, preferably 0.5 to 10 parts by weight based on 100 parts by weight of the total of said two or more kinds of the graft-modified olefin polymers (A2m) and the unmodified (A1a) optionally used.

In a preferred embodiment of the present invention, the modified olefin polymer (A2) is a polymer containing 50 to 100 mol % of structural units derived from propylene and 50 to 0 mol % of structural units derived from $\alpha$-olefins having 2 to 20 carbon atoms excluding propylene provided that total of the structural units derived from $\alpha$-olefins having 2 to 20 carbon atoms is 100 mol %. Here, preferred examples of the "$\alpha$-olefins having 2 to 20 carbon atoms excluding propylene" are 1-butene and octene. Here, in a more preferred embodiment, provided that the total of the structural units derived from $\alpha$-olefins having 2 to 20 carbon atoms is 100 mol %, the structural units derived from propylene preferably accounts for 55 to 90 mol %, more preferably 60 to 85 mol %, still more preferably 60 to 80 mol %, and the structural units derived from $\alpha$-olefins having 2 to 20 carbon atoms excluding propylene preferably accounts for 45 to 10 mol %, more preferably 40 to 15 mol %, still more preferably 40 to 20 mol %.

Thus, said inventive modified olefin polymer (A2) obtained from a polymer which contains structural units derived from $\alpha$-olefins having 2 to 20 carbon atoms and part or whole of which is graft-modified with a polar group-containing monomer include:

a modified olefin polymer (A2') which contains 0.1 to 15 parts by weight of structural units derived from the polar group-containing monomer based on 100 parts by weight of said modified olefin polymer;

a modified olefin polymer which contains 50 to 100 mol % of structural units derived from propylene and 50 to 0 mol % of structural units derived from $\alpha$-olefins having 2 to 20 carbon atoms excluding propylene, provided that the total of the structural units derived from $\alpha$-olefins having 2 to 20 carbon atoms is 100 mol %; and a modified olefin polymer (A2") fulfilling the requirements in terms of both the above-mentioned graft amount and the above-mentioned type and amount of structural units.

Halogenated Olefin Polymer (A3)

Examples of the halogenated olefin polymer (A3) are halogenated olefin polymers obtained from polymers which contain structural units derived from the $\alpha$-olefins having 2 to 20 carbon atoms and part or whole of which is halogen-modified. For example, in the present invention, a polymer containing structural units derived from $\alpha$-olefins having 2 to 20 carbon atoms, (A1b), is halogen-modified, and a halogen-modified olefin polymer (A3m) thus obtained can be defined as the halogenated olefin polymer (A3), and this can be used for the olefin polymer (A). Here, examples of the polymer (A1b) may be those given as the polymer (A1).

The polymer (A3) is preferably a polymer which contains structural units derived from $\alpha$-olefins having 2 to 20 carbon atoms and part or whole of which is halogen-modified, wherein based on the 100 parts by weight of the halogen-modified olefin polymer, the halogen content is 2 to 40 parts by weight.

The polymer (A3) is preferably a propylene-based polymer containing 50 to 100 mol % of structural units derived from propylene and 50 to 0 mol % of structural units derived from $\alpha$-olefins having 2 to 20 carbon atoms excluding propylene, provided that the total of the structural units derived from $\alpha$-olefins having 2 to 20 carbon atoms is 100 mol %. Here, preferred examples of the "$\alpha$-olefin having 2 to 20 carbon atoms excluding propylene" are 1-butene and octene.

Thus, said inventive halogenated olefin polymer (A3) obtained from a polymer which contains structural units derived from $\alpha$-olefins having 2 to 20 carbon atoms and part or whole of which is halogen-modified include:

a halogen-modified olefin polymer (A3') wherein the halogen content is 2 to 40 parts by weight based on 100 parts by weight of said halogen-modified olefin polymer;

a modified olefin polymer which contains 50 to 100 mol % of structural units derived from propylene and 50 to 0 mol % of structural units derived from $\alpha$-olefins having 2 to 20 carbon atoms excluding propylene, provided that the total of the structural units derived from $\alpha$-olefins having 2 to 20 carbon atoms is 100 mol %; and a halogen-modified olefin polymer (A3") fulfilling the requirements in terms of both the amount of halogen modification and the above-mentioned type and amount of structural units.

The halogenated olefin polymer (A3) may be a mixture of a halogen-modified product of (A1b) described above, i.e., the halogen-modified olefin polymer (A3m), and the unmodified (A1b) that form a halogen-modified olefin polymer composition. At this time, (A1b) used for halogen modification and (A1b) used without being modified may be the same or different. This embodiment is an example where part of the polymer containing structural units derived from $\alpha$-olefins having 2 to 20 carbon atoms is halogen-modified with a polar group-containing monomer.

The weight average molecular weight of the polymer (A1b) employable above is not particularly limited as long as the halogenated olefin polymer (A3) as a whole fulfills the above-mentioned weight average molecular weight, but is generally $1 \times 10^4$ to $1000 \times 10^4$, preferably $2 \times 10^4$ or more and $100 \times 10^4$ or less, more preferably $3 \times 10^4$ or more and $50 \times 10^4$ or less. The amount of heat of fusion as measured in accordance with JIS K 7122 is not particularly limited as long as (A3) fulfills the above-mentioned weight average molecular weight. Since halogenation tends to decrease the amount of heat of fusion, (A1b) to be used can be selected according to this tendency.

It is preferable that the halogenated olefin polymer (A3) contains 2 to 40 parts by weight of halogen based on 100 parts by weight of the total of the halogen-modified olefin polymer (A3m) and the unmodified polymer (A1b) optionally used.

In the present invention, the halogen-modified olefin polymer (A3m) that is preferably used to constitute the halogenated olefin polymer (A3) may be a chlorinated polyolefin.

The chlorinated polyolefin used in the present invention as the halogen-modified olefin polymer (A3m) is obtained by chlorinating a polyolefin by a known method. Here, the chlorinated polyolefin used as the halogen-modified olefin polymer (A3m) may be further modified with a polar group-containing monomer such as unsaturated carboxylic acids and their anhydrides (for example, maleic anhydride). Examples of commercially-available products that are preferably used are HARDLEN CY-9122P, HARDLEN CY-9124P, HARDLEN HM-21P, HARDLEN M-28P, HARDLEN F-2P and HARDLEN F-6P (product name, each of which is manufactured by TOYOBO CO., LTD.).

The chlorine content proportion of the chlorinated polyolefin is preferably 10% by weight or more and 40% by weight or less, more preferably 20% by weight or more and 30% by weight or less, based on the total of the chlorinated modified olefin polymer used as the halogen-modified olefin polymer (A3m) and the unmodified polymer (A1b) optionally used. The proportion of not more than the above upper limit is preferable because deterioration caused by exposure such as heat, sunlight, ultraviolet and rain is suppressed. The proportion of not less than the above lower limit is preferable because sufficient adhesion is obtained.

In the present invention, the halogen-modified olefin polymer (A3m) may be used singly or in combination of two or more kinds thereof.

The halogen-modified olefin polymer (A3m) can be obtained, for example, by dissolving a polyolefin in a chlorine-based solvent, and then blowing into the solution chlorine gas until the chlorine content proportion accounts for 16 to 35% by weight in the presence or absence of a radical catalyst.

Here, the chlorine-based solvent used as a solvent for chlorination reaction, is for example, tetrachloroethylene, tetrachloroethane, carbon tetrachloride, and chloroform.

The temperature at which the dissolution and chlorination reaction are performed is desirably not less than a temperature at which a polyolefin is dissolved in the chlorine-based solvent.

In the present invention, in the use of the halogenated olefin polymer (A3) as the olefin polymer (A) to prepare the coating agent wherein the halogen modification has been carried out in an organic solvent, the resultant polymer (A3) may be used as it is, or the same kind or different kind of organic solvent is further added to the polymer (A3) before the polymer (A3) is used. Examples of organic solvents employable at this time are the same solvents as those used for the modified olefin polymer (A2).

Further, in the present invention, the olefin polymer (A) may be a combination of two or more kinds selected from the polymer (A1), the modified olefin polymer (A2) and the halogenated olefin polymer (A3).

The olefin polymer (A) to be used in the present invention is preferably selected from the modified olefin polymer (A2) and the halogenated olefin polymer (A3), and is more preferably selected from the modified olefin polymer (A2), among the polymer (A1), the modified olefin polymer (A2) and the halogenated olefin polymer (A3). At this time, the modified olefin polymer (A2) may contain the unreacted polymer (A1a) which has not been graft-modified, as needed.

The olefin polymer (A) used in the present invention preferably has a kinematic viscosity as measured at 40° C. of more than 500000 cSt. Here, the feature that the kinematic viscosity is more than 500000 cSt is a concept that includes cases where the fluidity is too low for the kinematic viscosity to be measured.

Hydrocarbon-Based Synthetic Oil (B)

In the present invention, the hydrocarbon-based synthetic oil (B) constituting the coating agent is a hydrocarbon-based synthetic oil having a 40° C. kinematic viscosity of 30 to 500,000 cSt. The biggest feature of the coating agent according to the present invention is to include the hydrocarbon-based synthetic oil (B) as its constituent component. By virtue of this, for example, as compared with coating agents containing no hydrocarbon-based synthetic oil, such as the coating agent described in Patent Document 1, improved adhesion to a base material to be decorated is attained, and much more kinds of base materials can be decorated.

The hydrocarbon-based synthetic oil (B) is not particularly limited as long as fulfilling the above-mentioned kinematic viscosity, but preferred examples are polymers of olefins having 2 to 20 carbon atoms. Of these, particularly preferred is an oligomer obtained by homopolymerizing an olefin having 2 to 20 carbon atoms or an oligomer obtained by copolymerizing a mixture composed of any two or more kinds of these olefins. Preferred examples of the olefins having 2 to 20 carbon atoms are ethylene, propylene, 1-butene, 1-octene, 1-decene and 1-dodecene.

Here, the hydrocarbon-based synthetic oil (B) that is preferably used is an ethylene-based copolymer containing structural units derived from ethylene and structural units derived from α-olefins having 3 to 20 carbon atoms. In this case, the amount of the structural units derived from ethylene is 30 to 70 mol %, preferably 40 to 60 mol % based on 100 mol % of the total of the structural units derived from ethylene and the structural units derived from α-olefins having 3 to 20 carbon atoms. When the content of the structural units derived from ethylene is as described above, for example, the formation into a varnish hardly involves solidification at low temperature and thereby the stability of the varnish is improved.

Preferred examples of the α-olefin serving as a copolymerization component of the ethylene-based copolymer are α-olefins having 3 to 20 carbon atoms such as propylene, 1-butene, 1-pentene, 1-hexene, 1-octene, 1-decene, 1-dodecene, 1-tetradecene, 1-hexadecene, 1-octadecene and 4-methyl-1-pentene. Two or more kinds of these may be used. Of these, particularly preferred are α-olefins having 3 to 14 carbon atoms, and further preferred is propylene.

The ethylene-based copolymer as described above can be obtained by polymerizing ethylene and its copolymerization component, an α-olefin, for example, by using as an olefin polymerization catalyst a vanadium compound such as a vanadic acid ester, e.g., dichloridevanadic acid ethyl ester, in the presence of an organoaluminum compound such as ethyl aluminum sesquidichloride. At this time, the polymerization reaction may be carried out in a hydrocarbon medium. Specific examples of the hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and petroleum fractions such as gasoline, kerosene and light oil. Further, olefins to be used for polymerization may be used.

In the present invention, polymerization is carried out in the presence of the olefin polymerization catalyst described above. At this time, the vanadium compound is used in such an amount that the concentration of transition metal atoms in the polymerization reaction system is generally $10^{-9}$ to $10^{-1}$ mol, preferably $10^{-8}$ to $10^{-2}$ mol per 1 liter of reaction volume.

The temperature for polymerization of olefins using the olefin polymerization catalyst generally ranges −50 to +200° C., preferably 0 to 180° C. The polymerization pressure generally ranges from normal pressure to 10 MPa gauge pressure, preferably normal pressure to 5 MPa gauge pressure. The polymerization reaction may be carried out in any mode of batch mode, semi-continuous mode and continuous mode. Further, polymerization may be carried out in two or more separate stages differing in reaction conditions. The molecular weight of the resultant olefin polymer can be controlled by allowing hydrogen to be present in the polymerization system or by varying polymerization temperature.

The hydrocarbon-based synthetic oil (B) may be copolymers containing 90 to 100 mol % of structural units derived from α-olefins having 6 to 20 carbon atoms and 10 to 0 mol % of structural units derived from α-olefins having 2 to 5 carbon atoms. Among these, preferred are copolymers containing 90 to 100 mol % of structural units derived from α-olefins having 6 to 16 carbon atoms and 10 to 0 mol % of structural units derived from α-olefins having 2 to 5 carbon atoms: for example, copolymers containing structural units derived from α-olefins having 8 to 12 carbon atoms are one of preferred embodiments.

The copolymer described above can be produced by copolymerizing an α-olefin having 6 to 20 carbon atoms and optionally an α-olefin having 2 to 5 carbon atoms, from polymerization using a Ziegler catalyst, or from cation polymerization, heat polymerization or radical polymerization using Lewis acid as a catalyst.

In the present invention, the hydrocarbon-based synthetic oil (B) used may be liquid polybutene. Liquid polybutene is obtained from the polymerization of a C4 fraction material given through petroleum refining, the polymerization using a catalyst such as aluminum chloride and boron trichloride. Liquid polybutene is a polymer obtained by polymerizing isobutene as a main monomer, its examples including isobutene homopolymer and a copolymer of isobutene and n-butene. These are readily commercially available: examples are Nisseki Polybutene and Tetrax manufactured by JX Nippon Oil & Energy Corporation. Specific production process of liquid polybutene is described in Encyclopedia of Polymer Science and Engineering (2nd edition) Vol. 8 p 432 (John Wiley & Sons).

These hydrocarbon-based synthetic oils (B) described above may be used singly or in combination of two or more kinds thereof.

The hydrocarbon-based synthetic oil (B) used in the present invention has a 40° C. kinematic viscosity of 30 cSt or more and 500,000 cSt or less, preferably 300 cSt or more and 400,000 cSt or less, more preferably 5,000 cSt or more and 300,000 cSt or less. When the lower limit of the kinematic viscosity of the hydrocarbon-based synthetic oil (B) is higher, adhesion at the time of coating procedure tends to be much superior.

The addition amount of the hydrocarbon-based synthetic oil (B) used in the present invention is preferably 1 to 80% by weight based on 100% by weight of the total of the olefin polymer (A) and the hydrocarbon-based synthetic oil (B). That is, in a preferred embodiment of the present invention, provided that the total of the olefin polymer (A) and the hydrocarbon-based synthetic oil (B) is 100% by weight, the olefin polymer (A) accounts for 20 to 99% by weight, and the hydrocarbon-based synthetic oil (B) accounts for 80 to 1% by weight.

The addition amount of the hydrocarbon-based synthetic oil (B) used in the present invention is, when the oil (B) has a 40° C. kinematic viscosity of less than 2,000 cSt, as follows: based on 100% by weight of the total of the olefin polymer (A) and the hydrocarbon-based synthetic oil (B), the hydrocarbon-based synthetic oil (B) preferably accounts for 40% by weight or less, more preferably 35% by weight or less, still more preferably 25% by weight or less. In this case, the lower limit of the addition amount is preferably 2% by weight, more preferably 3% by weight based on 100% by weight of the total of the olefin polymer (A) and the hydrocarbon-based synthetic oil (B).

When the 40° C. kinematic viscosity is 2,000 cSt or more and 100,000 cSt or less, the hydrocarbon-based synthetic oil (B) preferably accounts for 70% by weight or less, preferably 60% by weight or less, still more preferably 40% by weight or less, based on 100% by weight of the total of the olefin polymer (A) and the hydrocarbon-based synthetic oil (B). In this case, the lower limit of the addition amount is preferably 1% by weight, more preferably 2% by weight, still more preferably 3% by weight, based on 100% by weight of the total of the olefin polymer (A) and the hydrocarbon-based synthetic oil (B).

When the 40° C. kinematic viscosity is 100,000 cSt or more and 500,000 cSt or less, the hydrocarbon-based synthetic oil (B) preferably accounts for 75% by weight or less, preferably 70% by weight or less, 60% by weight or less, based on 100% by weight of the total of the olefin polymer (A) and the hydrocarbon-based synthetic oil (B). In this case, the lower limit of the addition amount is preferably 3% by weight, more preferably 5% by weight, still more preferably 10% by weight, based on 100% by weight of the total of the olefin polymer (A) and the hydrocarbon-based synthetic oil (B).

When the addition amount is as described above, the coating film strength is particularly good and the adhesion is also particularly good.

The hydrocarbon-based synthetic oil (B) used in the present invention can be modified e.g., by being grafted with various vinyl compounds. Examples of the vinyl compounds include styrenes such as styrene and α-methylstyrene; acrylic acid esters such as methyl acrylate, butyl and octyl acrylate; methacrylic acid esters such as methyl methacrylate and butyl methacrylate; carboxyl group-containing vinyl compounds such as acrylic acid, methacrylic acid, cinnamic acid, maleic acid, maleic anhydride, fumaric acid, itaconic acid and maleic acid monoethyl; diesters of unsaturated dibasic acids, such as dimethyl fumarate and butyl fumarate; glycidyl-containing vinyl compounds such as acrylic acid glycidyl, acrylic acid-β-methyl glycidyl, methacrylic acid glycidyl, and methacrylic acid-β-methyl glycidyl; hydroxyl group-containing vinyl compounds such as hydroxyethyl acrylate, 2-hydroxyethyl (meth)acrylate, 2-hydroxypropyl (meth)acrylate, 4-hydroxybutyl acrylate, lactone-modified hydroxyethyl (meth) acrylate, and 2-hydroxy-3-phenoxypropyl acrylate; unsaturated carboxylic acids such as acrylonitrile, methacrylonitrile and cinnamic acid; acrylamide, methacrylamide, N-substituted acrylamide, N-substituted methacrylamide, and acrylamide propane sulfonic acid. The vinyl compounds may be used singly or in combination of two or more kinds thereof.

When good compatibility is achieved between the olefin polymer (A) and the hydrocarbon-based synthetic oil (B), it is believed that the crystallization rate of the olefin polymer (A) is decreased and this improves adhesion to an adherend interface. This is believed to result in the exhibition of adhesion inherent in the olefin polymer (A) to olefin resins, polar group-containing resins and metals.

Particularly, when the olefin polymer (A) is the modified olefin polymer (A2) and/or the halogenated olefin polymer (A3), the presence of the hydrocarbon-based synthetic oil (B) increases the adhesion strength with respect to a base material, which can be read from Example provided later. Reasons for this are not definite, but a possible explanation is as follows:

the presence of the hydrocarbon-based synthetic oil (B) makes molecules having polar groups or a halogen atom of the olefin polymer (A) readily movable; and when a base material, for example, contains e.g., a hetero atom or is a metal, the polar groups or the halogen atom are readily localized to parts contacting with the base material, thereby leading up to high adhesion strength.

Higher kinematic viscosity of the hydrocarbon-based synthetic oil (B) leads to a tendency of higher adhesion strength, which can be read from Example provided later. Reasons for this are not definite, but a possible explanation is that the use of a material having higher kinematic viscosity as the hydrocarbon-based synthetic oil (B) prevents the hydrocarbon-based synthetic oil (B) from bleeding out from a dry coating film. It is believed in this case that the loss of the effect resulting from adding the hydrocarbon-based synthetic oil (B) (imparting plasticity and making molecules having a polar group or a halogen atom ready to move) that is caused by bleed-out is more reduced, and that lowered adhesion caused by the formation of a layer composed only of the hydrocarbon-based synthetic oil (B) on the surface of the olefin polymer (A) is more reduced. Thereby, higher kinematic viscosity of the hydrocarbon-based synthetic oil (B) is believed to more reduce the adverse effect caused by bleed-out and provide superb balance.

Further, from the observation that the hydrocarbon-based synthetic oil (B) is difficult to bleed-out, it is believed that adhesion strength can be stable for a long period of time between a coating film composed of the coating agent and an adherend, and that high adhesion strength is achieved also when a film formed from the coating agent is not used for adhesion purpose immediately after its formation and instead used for adhesion purpose after the passage of some time from its formation.

Solvent

The coating agent of the present invention may further include, together with the olefin polymer (A) and the hydrocarbon-based synthetic oil (B), a solvent as needed.

The solvent is not particularly limited: for example, aromatic hydrocarbons such as benzene, toluene and xylene; aliphatic hydrocarbons such as hexane, heptane, octane and decane; alicyclic hydrocarbons such as cyclohexane, cyclohexene and methylcyclohexane; alcohols such as methanol, ethanol, isopropyl alcohol, butanol, pentanol, hexanol, propanediol and phenol; ketone-based solvents such as acetone, methyl isobutyl ketone (MIBK), methyl ethyl ketone (MEK), pentanone, hexanone, isophorone and acetophenone; cellosolves such as methylcellosolve and ethylcellosolve; esters such as methyl acetate, ethyl acetate, butyl acetate, methyl propionate and butyl formate; halogenated hydrocarbons such as trichloroethylene, dichloroethylene and chlorobenzene; and petroleum-based solvents such as Exxsol and Isopar. These may be used singly or in combination of multiple kinds thereof. Of these, toluene, methylcyclohexane/MIBK mixed solvent, methylcyclohexane/MEK mixed solvent, cyclohexane/MEK mixed solvent and Exxsol/cyclohexanone mixed solvent are preferably used. A solvent dispersed in e.g., water, may be used.

When the coating agent of the present invention contains a solvent, the total amount of the olefin polymer (A) and the hydrocarbon-based synthetic oil (B) is generally about 5 to 50% by weight, preferably 8 to 40% by weight, provided that the total of the olefin polymer (A), the hydrocarbon-based synthetic oil (B) and the solvent is 100% by weight.

Other Constituent Component

The coating agent of the present invention may contain other olefin resin (C) together with the olefin polymer (A) and the hydrocarbon-based synthetic oil (B). Said "other olefin resin (C)" is not particularly limited unless being any of the olefin polymer (A) and the hydrocarbon-based synthetic oil (B). Examples thereof include homopolymers of polyethylene, polypropylene, poly-1-butene or poly-4-methyl-1-pentene; random or block copolymers composed from α-olefins such as ethylene, propylene and 4-methyl-1-pentene; ethylene.propylene copolymer, ethylene.octene copolymer, propylene octane copolymer, ethylene.propylene.1-butene copolymer, ethylene.propylene.terpolymer, cyclic polyolefins, ethylene.vinyl acetate, copolymers of ethylene.unsaturated carboxylic acid, ethylene vinyl alcohol and ionomer resins.

As needed, additives for coating materials may be added: for example, transition metal compounds such as titanium oxide (rutile-type) and zinc oxide, pigments such as carbon black, viscosity-imparting agents such as thixotropic agents, thickening agents, rosin resins and terpene resins, defoaming agents, surface regulating agents, anti-settling agents, antioxidants, weathering agents, heat stabilizers, light stabilizers, pigment-dispersing agents and antistatic agents.

The addition of said other olefin resin (C) and additives for coating materials including transition metal compounds such as titanium oxide (rutile-type) and zinc oxide, pigments such as carbon black, viscosity-imparting agents such as thixotropic agents, thickening agents, rosin resins and terpene resins, defoaming agents, surface regulating agents, anti-settling agents, antioxidants, weathering agents, heat stabilizers, light stabilizers, pigment-dispersing agents and antistatic agents are generally carried out in a range which is not detrimental to the object of the coating agent of the present invention.

For example, when said other olefin resin (C) is added, its amount is preferably more than 0 and 50 parts by weight or less, more preferably 1 to 30 parts by weight, still more preferably 1 to 10 parts by weight, based on 100 parts by weight of the olefin polymer (A).

In an embodiment, said other olefin resin (C) is not contained.

Uses

The coating agent of the present invention is used preferably as a primer, a coating material, a hot melt adhesive and an optical transparent double-sided tape.

A method for forming a coating film of the coating agent of the present invention is not particularly limited and can be a known one. For example, coating procedure is carried out by methods such as, for example, die coating, flow coating, spray coating, bar coating, gravure coating, gravure reverse coating, kiss reverse coating, microgravure coating, roll coating, blade coating, rod coating, roll doctor coating, air knife coating, comma roll coating, reverse roll coating, transfer roll coating, kiss-roll coating, curtain coating and dipping coating. This is followed by appropriate drying such as natural drying or heat forcible drying. Thereby, a coating film can be obtained.

The decorative film of the present invention has no particular limitation, as long as having a layer obtained from the coating agent of the present invention and this layer is combined with a known design film. For example, a film previously decorated by e.g., printing, coating, deposition, or a decorated film formed by combining such a film, which is defined as a design layer, is laminated with the layer obtained from the coating agent of the present invention.

In other words, the decorative film of the present invention has at least one layer obtained from the above-described coating agent of the present invention. In a typical embodiment, the decorative film of the present invention has a design layer formed from a design film such as a film previously decorated by e.g., printing, coating, depositing, and also has the layer obtained from the above-described coating agent of the present invention, which layer, hereinafter in the present Description, is sometimes called the "coating film" when its form is focused on, and is sometimes called the "bonding layer" when its function is focused on.

Here, examples of a material of a film having the design layer include thermoplastic films such as acrylic film, PET film, polycarbonate film, COC film and vinyl chloride film.

A production process of the decorative film of the present invention is not particularly limited as long as the decorative film is provided with a layer (coating film) obtained from the coating agent of the present invention. Specifically, the following methods can be mentioned, for example: a method in which the coating film of the present invention, opposite an adherend of a decorative film having a design layer, is dry-laminated on the adherend; a method in which the coating film of the present invention is provided directly with the design layer by e.g., printing; and a method in which on the above film, a clear layer, a coating material layer and the layer formed from the coating film of the present invention (that is, the layer obtained from the coating agent of the present invention) are sequentially formed by e.g., printing.

Regarding the decorative film having the coating film of the present invention, for example, by utilizing an existing vacuum forming method such as vacuum forming method and pressure/vacuum forming method, insert molding method and in-mold molding method, or TOM technique using a "vacuum forming apparatus" described in JP-B-3733564 (Patent Document 7), an article with complicated three-dimensional structure can be decorated.

Examples of an adherend of the decorative film preferably used in the present invention are polyolefin materials such as PP, ABS, PC, PET, acrylic resin and metal materials such as ED steel plate, Mg alloy, SUS and aluminum alloy. The adherend may be a composite of the resin described above and the metal material described above.

An article obtained by the decorating method can be favorably used for applications including automobile interior/exterior parts; various front panels for audio visual systems; surface decorative materials such as buttons and emblems; various parts, e.g., case bodies, housings, display windows and buttons, of e.g., mobile phones; exterior materials for furniture; interior materials for architecture such as bath rooms, wall surfaces, ceilings and floors; exterior materials for architecture such as exterior walls, e.g., sidings, fences, roofs, doors and barge boards; surface decorative materials for furniture such as window frames, doors, handrails, thresholds and lintels; optical materials such as various displays, lenses, mirrors, goggles and window glasses; interior/exterior parts of various vehicles other than automobiles, such as trains, air planes and ships; and various packaging containers such as bottles, containers for cosmetics and accessory cases, packaging materials, sundries such as free gifts and small items and other various uses.

EXAMPLES (Measurement of Propylene Content and Ethylene Content)
Propylene content and ethylene content were determined by $^{13}$C-NMR.

(Measurement of Melting Point and Amount of Heat of Fusion)
The melting point and the amount of heat of fusion were determined by using a differential scanning calorimeter (DSC-Q1000, manufactured by TA Instruments). In a process composed of increasing temperature at 10° C./min from 30° C. to 180° C., and then decreasing temperature at 10° C./min to 0° C., and thereafter increasing temperature again at 10° C./min to 150° C., thermogram obtained at the time of the second temperature-increase was used to measure a melting point and an amount of heat of fusion in accordance with JIS K 7122.

(Measurement of 40° C. Kinematic Viscosity)
In accordance with ASTM D 445, the measurement was carried out.

(Measurement of Weight Average Molecular Weight (Mw) and Molecular Weight Distribution (Mw/Mn))
The molecular weight and molecular weight distribution of the olefin polymer (A) and the hydrocarbon-based synthetic oil (B) were measured by using gel permeation chromatography (LC-10 series, manufactured by Shimadzu Corporation) under conditions described below.

Detector: C-R4A, manufactured by Shimadzu Corporation
Column: TSKG 6000H-TSKG 4000H-TSKG 3000H-TSKG 2000H (manufactured by Tosoh Corporation)
Mobile phase: tetrahydrofuran
Temperature: 40° C.
Flow rate: 0.8 ml/min By using a calibration curve prepared from monodispersion standard polystyrene, Mw and Mw/Mn were calculated.

(Measurement of Graft Amount of Polar Group-Containing Monomer)
The measurement was in accordance with $^1$H-NMR.

(Chlorine Content)
In accordance with JISK 7229, the chlorine content was determined from the following equation.

$$\text{Chlorine content (mass \%)} = \{(A-B) \times F\}/S \times 100$$

A: amount of 0.0282N aqueous silver nitrate solution (ml) required for titration of sample
B: amount of 0.0282N aqueous silver nitrate solution (ml) required for titration of blank sample
F: Titer of 0.0282N aqueous silver nitrate solution
S: mass of sample (mg)

Production Example 1-1

Synthesis of Propylene/1-Butene Copolymer

To a 2 Z autoclave that had been sufficiently purged with nitrogen, 900 ml of hexane and 90 g of 1-butene were introduced. This was followed by adding 1 mmol of triisobutylaluminum, and temperature was increased to 70° C. Thereafter, propylene was fed so that the total pressure was 7 kg/cm$^2$G, and 0.30 mmol of methylaluminoxane and 0.001 mmol in terms of Zr atom of rac-dimethylsilylene-bis{1-(2-methyl-4-phenylindenyl)}zirconium dichloride were added. With propylene continuously fed so that the total pressure was kept at 7 kg/cm$^2$G, polymerization was carried out for 30 minutes. After the polymerization, deaeration was carried out. Then, a polymer was collected in a large amount of methanol, and the polymer collected was vacuum dried at 110° C. for 12 hours. The resultant propylene/1-butene copolymer (low-crystalline olefin resin A-1) had a melting point of 78.3° C., a heat of fusion of 29.2 J/g, Mw of 330,000, and a propylene content of 67.2 mol %.

Production Example 1-2

Synthesis of Maleic Anhydride-Modified Propylene/1-Butene Copolymer 3 kg of the propylene/1-butene copolymer (low-crystalline olefin resin A-1) was added to 10 Z of toluene. Under nitrogen atmosphere, temperature was increased to 145° C. to allow the copolymer to be dissolved in toluene. Further, under stirring, 382 g of maleic anhydride, and 175 g of di-tert-butyl peroxide were fed into the system over 4 fours, subsequently followed by stirring at 145° C. for 2 hours. After cooling, a large amount of acetone was introduced to allow the modified copolymer to precipitate. The copolymer was filtered, washed with acetone and vacuum-dried.

The resultant maleic anhydride-modified propylene/1-butene copolymer (low-crystalline olefin resin A-2) had a melting point of 75.8° C., a heat of fusion of 28.6 J/g, Mw of 110,000, and had 1 part by weight of a graft amount of maleic anhydride based on 100 parts by weight of the modified copolymer.

Production Example 2-1

Synthesis of Ethylene/Propylene Copolymer

To a continuous-polymerization reaction vessel with a stirring blade that had been sufficiently purged with nitrogen, 1liter of hexane dehydrated and purified was added, and 500 ml/h of a hexane solution of ethylaluminumsesquichloride (Al(C$_2$H$_5$)$_{1.5}$Cl$_{1.5}$) controlled to account for 96 mmol/L was continuously fed for 1 hour. Further, 500 ml/h of a hexane solution of VO(OC$_2$H$_5$)Cl$_2$ controlled to account for 16 mmol/l as a catalyst, and 500 ml/h of hexane were continuously fed. Meanwhile, a polymerization liquid was continuously discharged from the upper part of the polymerization vessel such that a polymerization liquid was always kept present in an amount of 1 liter in the polymerization vessel. Then, by using a bubbling tube, 27 L/h of ethylene gas, 26 L/h of propylene gas and 100 L/h of hydrogen gas were fed. With a refrigerant circulated through a jacket attached to the outside of the polymerization vessel, copolymerization reaction was carried out at 35° C. The resultant polymerization solution, after decalcified with hydrochloric acid, was introduced into a large amount of methanol to allow precipitation to happen, followed by vacuum drying at 130° C. for 24 hours.

The resultant ethylene/propylene copolymer (hydrocarbon-based synthetic oil B-1) had an ethylene content of 53.0 mol % and a 40° C. kinematic viscosity of 400 cSt.

Production Examples 2-2 to 2-5

Synthesis of Ethylene/Propylene Copolymer

Copolymerization was carried out in the same manner as in Production Example 2-1, except that the flow rates of ethylene gas, propylene gas and hydrogen gas are as shown in Table 1, so that an ethylene/propylene copolymer (any of the hydrocarbon-based synthetic oils B-2 to B-5) was prepared. Properties of the resultant polymers are shown in Table 1.

TABLE 1

| | Hydrocarbon-based synthetic oil | | B-1 | B-2 | B-3 | B-4 | B-5 |
|---|---|---|---|---|---|---|---|
| Production conditions | Flow rate of ethylene gas | L/h | 27 | 35 | 41 | 44 | 47 |
| | Flow rate of propylene gas | L/h | 26 | 35 | 41 | 44 | 47 |
| | Flow rate of hydrogen gas | L/h | 100 | 80 | 60 | 40 | 20 |
| Composition Properties | Ethylene content | mol % | 53 | 54.9 | 55.5 | 55.7 | 55.9 |
| | 40° C. kinematic viscosity | cSt | 400 | 1,300 | 9,850 | 18,900 | 37,500 |
| | Molecular weight distribution (Mw/Mn) | — | 1.6 | 1.7 | 1.8 | 1.8 | 1.9 |

Example 1

90 g of the low-crystalline olefin resin A-2 and 10 g of the hydrocarbon-based synthetic oil B-1 were dissolved in 400 g of toluene to prepare an adhesive varnish. The adhesive varnish prepared was applied on a hard aluminum (30 μm in thickness), and dried at 200° C. for 1 minute, to give a coating film with a dry film thickness of 20 μm. The resultant hard aluminum with the coating film (bonding layer) was press-contacted on a polypropylene adherend (manufactured by Testpiece Co., Ltd.; 25×50×2 mm) by using a heat sealer (TP-701-B, manufactured by TESTER SANGYO CO., LTD.) under the conditions of 110° C., 0.3 MPa and 20 seconds.

The sample piece was allowed to stand still overnight at room temperature, and was notched in a strip form of 1 cm in width by using a cutter. By using Autograph (AGS-500B manufactured by Shimadzu Corporation), aluminum was peeled under conditions of 180° and 100 mm/min to measure peel strength.

Example 2

Example 1 was repeated except that the hydrocarbon-based synthetic oil B-1 was replaced with the hydrocarbon-based synthetic oil B-2, and peel strength was measured.

Example 3

Example 1 was repeated except that the hydrocarbon-based synthetic oil B-1 was replaced with the hydrocarbon-based synthetic oil B-3, and peel strength was measured.

Example 4

Example 1 was repeated except that the hydrocarbon-based synthetic oil B-1 was replaced with the hydrocarbon-based synthetic oil B-4, and peel strength was measured.

Example 5

Example 1 was repeated except that 90 g of the low-crystalline olefin resin A-2 and 10 g of the hydrocarbon-based synthetic oil B-1 were replaced with 80 g of the resin A-2 and 20 g of the hydrocarbon-based synthetic oil B-5, and peel strength was measured.

Example 6

Example 1 was repeated except that 90 g of the low-crystalline olefin resin A-2 and 10 g of the hydrocarbon-based synthetic oil B-1 were replaced with 70 g of the low-crystalline olefin resin A-2 and 30 g of the hydrocarbon-based synthetic oil B-5, and peel strength was measured.

Example 7

Example 1 was repeated except that hydrocarbon-based synthetic oil B-1 was replaced with poly-α-olefin (hydrocarbon-based synthetic oil B-6; Synfluid PAO-40 manufactured by Chevron Phillips Chemical Company, 40° C. kinematic viscosity: 410 cSt), and peel strength was measured.

Example 8

Example 1 was repeated except that hydrocarbon-based synthetic oil B-1 was replaced with poly-α-olefin (hydrocarbon-based synthetic oil B-7; Synfluid PAO-100 manufactured by Chevron Phillips Chemical Company, 40° C. kinematic viscosity: 1250 cSt), and peel strength to was measured.

Example 9

Example 5 was repeated except that the low-crystalline olefin resin A-2 was replaced with a chlorinated polyolefin (low-crystalline olefin resin A-3; HARDLEN CY-9124P, manufactured by TOYOBO CO., LTD., heat of fusion: 0 J/g, Mw: 85,000, chlorine content: 24% by weight), and peel strength was measured.

Example 10

Example 1 was repeated except that 90 g of the low-crystalline olefin resin A-2 and 10 g of the hydrocarbon-based synthetic oil B-1 were replaced with 60 g of the low-crystalline olefin resin A-2 and 40 g of polybutene (hydrocarbon-based synthetic oil B-8; Nisseki Polybutene HV-1900 manufactured by JX Nippon Oil & Energy Corporation, 40° C. kinematic viscosity: 160,000 cSt), and peel strength was measured.

Comparative Example 1

Example 1 was repeated except that 90 g of the low-crystalline olefin resin A-2 and 10 g of the hydrocarbon-based synthetic oil B-1 were replaced with 100 g of the low-crystalline olefin resin A-2, and peel strength was measured.

Comparative Example 2

Example 1 was repeated except that 90 g of the low-crystalline olefin resin A-2 and 10 g of the hydrocarbon-based synthetic oil B-1 were replaced with 100 g of the low-crystalline olefin resin A-1, and peel strength was measured.

Comparative Example 3

Example 1 was repeated except that 90 g of the low-crystalline olefin resin A-2 and 10 g of the hydrocarbon-based synthetic oil B-1 were replaced with 100 g of the low-crystalline olefin resin A-3, and peel strength was measured.

Comparative Example 4

Example 1 was repeated except that 90 g of the low-crystalline olefin resin A-2 and 10 g of the hydrocarbon-based synthetic oil B-1 were replaced with 100 g of the hydrocarbon-based synthetic oil B-5, and peel strength was measured.

Table 2 shows evaluation results of Examples 1 to 10 and Comparative Examples 1 to 4.

TABLE 2

|  |  | Example 1 | Example 2 | Example 3 | Example 4 | Example 5 |
|---|---|---|---|---|---|---|
| Composition | Low-crystalline olefin resin (A) | A-2 | A-2 | A-2 | A-2 | A-2 |
|  | % by weight | 90 | 90 | 90 | 90 | 80 |
|  | Hydrocarbon-based synthetic oil (B) | B-1 | B-2 | B-3 | B-4 | B-5 |
|  | % by weight | 10 | 10 | 10 | 10 | 20 |
| Adhesion | Adherend | PP | PP | PP | PP | PP |
|  | Contact-pressing temperature (° C.) | 110 | 110 | 110 | 110 | 110 |
|  | 180° peel strength (N/cm) | 12.0 | 15.2 | 15.4 | 15.9 | 16.9 |

|  |  | Example 6 | Example 7 | Example 8 | Example 9 | Example 10 |
|---|---|---|---|---|---|---|
| Composition | Low-crystalline olefin resin (A) | A-2 | A-2 | A-2 | A-3 | A-2 |
|  | % by weight | 70 | 90 | 90 | 80 | 60 |
|  | Hydrocarbon-based synthetic oil (B) | B-5 | B-6 | B-7 | B-5 | B-8 |
|  | % by weight | 30 | 10 | 10 | 20 | 40 |
| Adhesion | Adherend | PP | PP | PP | PP | PP |
|  | Contact-pressing temperature (° C.) | 110 | 110 | 110 | 110 | 110 |
|  | 180° peel strength (N/cm) | 14.5 | 12.0 | 15.0 | 5.9 | 17.3 |

|  |  | Comparative Example 1 | Comparative Example 2 | Comparative Example 3 | Comparative Example 4 |
|---|---|---|---|---|---|
| Composition | Low-crystalline olefin resin (A) | A-2 | A-1 | A-3 | — |
|  | % by weight | 100 | 100 | 100 | 0 |
|  | Hydrocarbon-based synthetic oil (B) | — | — | — | B-5 |
|  | % by weight | 0 | 0 | 0 | 100 |
| Adhesion | Adherend | PP | PP | PP | PP |
|  | Contact-pressing temperature (° C.) | 110 | 110 | 110 | 110 |
|  | 180° peel strength (N/cm) | 3.1 | 0.0 | 3.1 | 0.0 |

Example 11

Example 5 was repeated except that the adherend was ABS (manufactured by Testpiece Co., Ltd.; 25×50×2 mm) and the press-contacting temperature was 100° C., and peel strength to ABS was measured.

Example 12

Example 5 was repeated except that the adherend was polycarbonate (manufactured by Testpiece Co., Ltd.; 25×50×2 mm) and the press-contacting temperature was 100° C., and peel strength to polycarbonate was measured.

Example 13

Example 5 was repeated except that the adherend was a hard vinyl chloride resin (manufactured by Testpiece Co., Ltd.; 25×50×2 mm) and the press-contacting temperature was 100° C., and peel strength to the hard vinyl chloride resin was measured.

Example 14

Example 5 was repeated except that the adherend was poly(methyl methacrylate) resin (manufactured by Testpiece Co., Ltd.; 25×50×2 mm) and the press-contacting temperature was 100° C., and peel strength to the poly(methyl methacrylate) resin was measured.

Example 15

Example 5 was repeated except that the adherend was a polyethylene terephthalate resin (manufactured by Testpiece Co., Ltd.; 25×50×2 mm) and the press-contacting temperature was 100° C., and peel strength to the polyethylene terephthalate resin was measured.

Example 16

Example 5 was repeated except that the adherend was an aluminum alloy A1050 (manufactured by Testpiece Co., Ltd.; 25×50×2 mm) and the press-contacting temperature was 100° C., and peel strength to the aluminum alloy was measured.

Comparative Example 5

Comparative Example 1 was repeated except that the adherend was ABS (manufactured by Testpiece Co., Ltd.; 25×50×2 mm) and the press-contacting temperature was 100° C., and peel strength to ABS was measured.

Comparative Example 6

Comparative Example 1 was repeated except that the adherend was polycarbonate (manufactured by Testpiece Co., Ltd.; 25×50×2 mm) and the press-contacting temperature was 100° C., and peel strength to polycarbonate was measured.

Comparative Example 7

Comparative Example 1 was repeated except that the adherend was a hard vinyl chloride resin (manufactured by Testpiece Co., Ltd.; 25×50×2 mm) and the press-contacting temperature was 100° C., and peel strength to the hard vinyl chloride resin was measured.

Comparative Example 8

Comparative Example 1 was repeated except that the adherend was a poly(methyl methacrylate) resin (manufactured by Testpiece Co., Ltd.; 25×50×2 mm) and the press-contacting temperature was 100° C., and peel strength to the poly(methyl methacrylate) resin was measured.

Comparative Example 9

Comparative Example 1 was repeated except that the adherend was a polyethylene terephthalate resin (manufactured by Testpiece Co., Ltd.; 25×50×2 mm) and the press-contacting temperature was 100° C., and peel strength to the polyethylene terephthalate resin was measured.

Comparative Example 10

Comparative Example 1 was repeated except that the adherend was an aluminum alloy A1050 (manufactured by Testpiece Co., Ltd.; 25×50×2 mm) and the press-contacting temperature was 100° C., and peel strength to the aluminum alloy was measured.

Table 3 shows evaluation results of Examples 11 to 16 and Comparative Examples 5 to 10.

TABLE 3

| | | Example 11 | Example 12 | Example 13 | Example 14 | Example 15 | Example 16 |
|---|---|---|---|---|---|---|---|
| Composition | Low-crystalline olefin resin (A) | A-2 | A-2 | A-2 | A-2 | A-2 | A-2 |
| | % by weight | 80 | 80 | 80 | 80 | 80 | 80 |
| | Hydrocarbon-based synthetic oil (B) | B-5 | B-5 | B-5 | B-5 | B-5 | B-5 |
| | % by weight | 20 | 20 | 20 | 20 | 20 | 20 |
| Adhesion | Adherend | ABS | PC | hard PVC | PMMA | PET | A1050 |
| | Contact-pressing temperature (° C.) | 100 | 100 | 100 | 100 | 100 | 100 |
| | 180° peel strength (N/cm) | 15.4 | 10.8 | 6.4 | 12.7 | 15.9 | 15.9 |

| | | Comparative Example 5 | Comparative Example 6 | Comparative Example 7 | Comparative Example 8 | Comparative Example 9 | Comparative Example 10 |
|---|---|---|---|---|---|---|---|
| Composition | Low-crystalline olefin resin (A) | A-2 | A-2 | A-2 | A-2 | A-2 | A-2 |
| | % by weight | 100 | 100 | 100 | 100 | 100 | 100 |
| | Hydrocarbon-based synthetic oil (B) | — | — | — | — | — | — |
| | % by weight | 0 | 0 | 0 | 0 | 0 | 0 |

TABLE 3-continued

| Adhesion | Adherend | ABS | PC | hard PVC | PMMA | PET | A1050 |
|---|---|---|---|---|---|---|---|
| | Contact-pressing temperature (° C.) | 100 | 110 | 100 | 100 | 100 | 100 |
| | 180° peel strength (N/cm) | 0.3 | 3.8 | 0.1 | 0.5 | 0.1 | 0.1 |

Example 17

(Preparation of Adhesive Varnish)

80 g of the low-crystalline olefin resin A-2 and 20 g of the hydrocarbon-based synthetic oil B-5 were dissolved in 400 g of toluene to prepare an adhesive varnish.

(Synthesis of Resin for UV-Curing Layer)

A mixed solution composed of 85 g of methyl methacrylate (MMA), 14 g of 2-hydroxyethyl methacrylate (HEMA), 1 g of methacrylic acid (MAA) and 1 g of azobisisobutyronitrile was dropwise added into a reaction vessel that had been charged with 85 g of toluene and 37 g of n-butanol, under the stream of air at 100° C. over 4 hours. Further, with temperature kept at 100° C., 0.2 g of azobisisobutyronitrile was added two times every 1 hour to terminate the polymerization. Three hours after the completion of the dropwise adding, cooling was performed. As a result, a polymer solution having involatile content of 45% and a weight average molecular weight of 25000 was obtained.

Further, 111 g of this polymer solution (solid content: 50 g) was mixed with 50 g of pentaerythritol triacrylate (PETA) and 3 g of IRGACURE 184 (photoinitiator manufactured by Ciba Specialty Chemicals), to prepare a solution of a resin for UV-curing layer.

(Preparation of Laminate Film)

The adhesive varnish was applied on a release PET film which had been coated with silicon and which had a film thickness of 200 μm, and was dried at 80° C. for 10 minutes. The resultant adhesive layer had a film thickness of 20 μm. Further, thereon, ALMATEX L 1053 (product available from Mitsui Chemicals, Inc., acrylic resin) was applied, and dried at 60° C. for 20 minutes. The resultant intermediate layer had a film thickness of 30 μm. Further, thereon, the above resin for UV-curing layer was applied, and dried at 60° C. for 10 minutes. The resultant UV-curing layer had a film thickness of 30 μm. Finally, thereon, a PET film (Novaclear SG007; manufactured by Mitsubishi Chemical Corporation) was laminated by using a rubber roll. Thereby, a laminate film was prepared.

(Decorative-Forming Test)

Polypropylene (Testpiece Co., Ltd.; 25 mm×100 mm×2 mm) was placed on an ascending/descending table attached in a two-sided vacuum forming apparatus having upper and lower boxes (product name: NGF-0404, manufactured by Fu-se Vacuum Forming Ltd.). Thereafter, the release PET film of the laminate film obtained above was peeled. To a sheet clamping frame located above a molded base material (molded article) in the two-sided vacuum forming apparatus, the laminate film from which the release PET film had been peeled (hereinafter, referred to as the laminate film) was set. Subsequently, pressure was decreased such that the degree of vacuum in the upper and lower boxes was 99.0 kPa, and heating was carried out by using a near infrared heater until the temperature of the laminate film was 90° C. The molded base material was ascended, and the molded base material and the laminate film were press-contacted with each other, and the press-contacting was maintained for 5 seconds. Thereafter, only the upper box was released to atmospheric pressure. A decorative article which was decorated with the laminate film was obtained.

Further, the PET film side of the decorative article was irradiated with ultraviolet ray by using an ultraviolet ray irradiation apparatus with three high-pressure mercury lamps each with 100 w/cm, the irradiation distance being 10 cm and the line speed being 10 m/min, to cure the UV-curing layer. A UV (ultraviolet ray) cured article was thus obtained.

The adhesion of the laminate film in the resultant UV (ultraviolet ray) cured article was tested in accordance with grid peel test (JIS K5600-5-6) in which peel number was recorded. The adhesion was graded as acceptable (AA) only when peel number was zero, and when peel number was not zero, the adhesion was graded as unacceptable (BB).

ABS, polycarbonate, hard vinyl chloride resin, poly(methyl methacrylate) resin, polyethylene terephthalate resin or aluminum alloy A1050 (each of which is manufactured by Testpiece Co., Ltd.; 25 mm×100 mm×2 mm) were also used as an adherend instead of the polypropylene, and the same test was repeated to evaluate adhesion to the respective adherends.

Comparative Example 11

Example 17 was repeated except that 80 g of the low-crystalline olefin resin A-2 and 20 g of the hydrocarbon-based synthetic oil B-5 were replaced with 100 g of the low-crystalline olefin resin A-2, and tests of decorative forming with respect to various adherends were carried out.

Table 4 shows evaluation results of Example 17 and Comparative Example 11.

TABLE 4

| | | Example 17 |||||||
|---|---|---|---|---|---|---|---|---|
| Composition | Low-crystalline olefin resin (A) | A-2 |||||||
| | % by weight | 80 |||||||
| | Hydrocarbon-based synthetic oil (B) | B-5 |||||||
| | % by weight | 20 |||||||
| Forming conditions | Adherend | PP | ABS | PC | hard PVC | PMMA | PET | A1050 |
| | Contact-pressing temperature (° C.) | 90 |||||||
| Result of forming | Adhesion | AA | AA | AA | AA | AA | AA | AA |

TABLE 4-continued

|  |  |  |  |  | Comparative Example 11 |  |  |  |
|---|---|---|---|---|---|---|---|---|
| Composition | Low-crystalline olefin resin (A) |  |  |  | A-2 |  |  |  |
|  | % by weight |  |  |  | 100 |  |  |  |
|  | Hydrocarbon-based synthetic oil (B) |  |  |  | — |  |  |  |
|  | % by weight |  |  |  | 0 |  |  |  |
| Adhesion | Adherend | PP | ABS | PC | hard PVC | PMMA | PET | A1050 |
|  | Contact-pressing temperature (° C.) |  |  |  | 90 |  |  |  |
| Result of forming | Adhesion | BB | BB | BB | BB | BB | BB | BB |

The invention claimed is:

1. A coating agent comprising an olefin polymer (A) having a heat of fusion as measured in accordance with JIS K 7122 being in the range of 0 to 50 J/g and having a weight average molecular weight (Mw) as measured by GPC of $1 \times 10^4$ to $1000 \times 10^4$, and a hydrocarbon-based synthetic oil (B) having a 40° C. kinematic viscosity of 1250 to 500,000 cSt, wherein the olefin polymer (A) is at least one selected from the group consisting of (A1") to (A3"):

(A1") a propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %);

(A2") a modified olefin polymer obtained from a propylene-based polymer part or whole of which is graft-modified with a polar group-containing monomer, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the modified olefin polymer, 0.1 to 15 parts by weight of structural units derived from the polar group-containing monomer is contained; and (A3") a halogen-modified olefin polymer obtained from a propylene-based polymer part or whole of which is halogen-modified, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the halogen-modified olefin polymer, the halogen content is 2 to 40 parts by weight.

2. The coating agent according to claim 1, wherein the polar group-containing monomer is at least one selected from unsaturated carboxylic acids and unsaturated carboxylic acid anhydrides.

3. The coating agent according to claim 1, wherein the hydrocarbon-based synthetic oil (B) is a polymer of an olefin having 2 to 20 carbon atoms.

4. The coating agent according to claim 1, wherein the olefin polymer (A) accounts for 20 to 99 parts by weight, and the hydrocarbon-based synthetic oil (B) accounts for 80 to 1 parts by weight (provided that the total of (A) and (B) is 100 parts by weight).

5. The coating agent according to claim 1, which is a primer.

6. The coating agent according to claim 1, which is a coating material.

7. The coating agent according to claim 1, which is a hot melt adhesive.

8. A decorative film having at least one layer formed from the coating agent according to claim 1.

9. An article decorated with the decorative film according to claim 8.

10. The article according to claim 9, wherein the decoration is performed by using a vacuum pressure forming machine.

11. The coating agent according to claim 1, wherein the α-olefin having 2 to 20 carbon atoms excluding propylene in (A1") to (A3") is 1-butene or octane.

* * * * *